US010150170B2

(12) United States Patent
Nam et al.

(10) Patent No.: US 10,150,170 B2
(45) Date of Patent: Dec. 11, 2018

(54) INSERT AND TOOL HOLDER FOR MOUNTING SAME

(71) Applicant: KORLOY INC., Seoul (KR)

(72) Inventors: Ki-Chan Nam, Cheongju-si (KR); Kane-Hee Lee, Cheongju-si (KR); Young-Heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 150 days.

(21) Appl. No.: 15/127,046

(22) PCT Filed: Apr. 15, 2015

(86) PCT No.: PCT/KR2015/003769
§ 371 (c)(1),
(2) Date: Sep. 19, 2016

(87) PCT Pub. No.: WO2015/163636
PCT Pub. Date: Oct. 29, 2015

(65) Prior Publication Data
US 2017/0113286 A1    Apr. 27, 2017

(30) Foreign Application Priority Data

Apr. 22, 2014    (KR) .......................... 10-2014-0048168

(51) Int. Cl.
*B23C 5/20*    (2006.01)
*B23C 5/22*    (2006.01)
*B23C 5/06*    (2006.01)

(52) U.S. Cl.
CPC ............... *B23C 5/207* (2013.01); *B23C 5/06* (2013.01); *B23C 2200/0411* (2013.01);
(Continued)

(58) Field of Classification Search
CPC ... B23C 2200/0411; B23C 5/06; B23C 5/207; B23C 2200/125; B23C 2200/286; B23C 2210/045; B23C 2210/168
See application file for complete search history.

(56) References Cited

U.S. PATENT DOCUMENTS 5,078,550 A * 1/1992 Satran ..................... B23C 5/202
407/113
5,145,295 A * 9/1992 Satran ................... B23C 5/2213
407/113
(Continued)

FOREIGN PATENT DOCUMENTS

JP    2010-523352 A    7/2010
KR    10-0662808 B1    12/2006
(Continued)

*Primary Examiner* — Sara Addisu
(74) *Attorney, Agent, or Firm* — Rabin & Berdo, P.C.

(57) ABSTRACT

Provided is an insert for being mounted on a tool holder. The insert includes three substantially right-angled corners along a perimeter, a main cutting edge, a sub cutting edge, and a flat lower surface. A clearance angle of a second end main side surface forms an obtuse angle with respect to a lower surface, and a clearance angle of a second end sub side surface forms an obtuse angle with respect to the lower surface. A clearance angle of a first end main side surface forms a right angle with respect to the lower surface, and a clearance angle of a first end sub side surface forms a right angle with respect to the lower surface.

4 Claims, 7 Drawing Sheets

(52) U.S. Cl.
CPC .. *B23C 2200/125* (2013.01); *B23C 2200/286* (2013.01); *B23C 2210/045* (2013.01); *B23C 2210/168* (2013.01)

(56) References Cited

U.S. PATENT DOCUMENTS

| | | | | |
|---|---|---|---|---|
| 5,388,932 A * | 2/1995 | DeRoche | ............... | B23C 5/207 407/113 |
| 5,441,370 A * | 8/1995 | Pantzar | ............... | B23C 5/202 407/113 |
| 5,443,334 A * | 8/1995 | Pantzar | ............... | B23C 5/207 407/113 |
| 5,460,464 A * | 10/1995 | Arai | ............... | B23C 5/109 407/114 |
| 5,593,255 A * | 1/1997 | Satran | ............... | B23C 5/109 407/113 |
| 5,810,519 A * | 9/1998 | Vogel | ............... | B23C 5/109 407/114 |
| 5,810,521 A | 9/1998 | Pantzar et al. | | |
| 5,947,650 A * | 9/1999 | Satran | ............... | B23C 5/00 407/113 |
| 6,142,716 A * | 11/2000 | Jordberg | ............... | B23C 5/202 407/114 |
| 6,193,446 B1 * | 2/2001 | Astrom | ............... | B23C 5/202 407/114 |
| 6,196,770 B1 * | 3/2001 | Astrom | ............... | B23C 5/109 407/114 |
| 6,293,737 B1 * | 9/2001 | Satran | ............... | B23C 5/2221 407/113 |
| 6,503,028 B1 * | 1/2003 | Wallstrom | ............... | B23C 5/109 407/35 |
| 6,929,427 B2 * | 8/2005 | Satran | ............... | B23C 5/109 407/113 |
| 7,040,844 B1 * | 5/2006 | Daiguji | ............... | B23C 5/109 407/113 |
| 9,079,251 B2 * | 7/2015 | Dufour | ............... | B23B 27/145 |
| 2004/0071515 A1 * | 4/2004 | Arvidsson | ............... | B23C 5/109 407/113 |
| 2004/0131431 A1 * | 7/2004 | Satran | ............... | B23C 5/109 407/40 |
| 2010/0003090 A1 * | 1/2010 | Johansson | ............... | B23C 5/202 407/113 |
| 2010/0080662 A1 | 4/2010 | Satran et al. | | |
| 2010/0215446 A1 * | 8/2010 | Wandeback | ............... | B23C 5/06 407/51 |
| 2011/0305534 A1 | 12/2011 | Park et al. | | |
| 2013/0294850 A1 | 11/2013 | Park | | |
| 2016/0023282 A1 * | 1/2016 | Ramesh | ............... | B23B 51/048 408/233 |
| 2017/0282262 A1 * | 10/2017 | Burtscher | ............... | B23C 5/207 |
| 2018/0015554 A1 * | 1/2018 | Roman | ............... | B23C 5/207 |

FOREIGN PATENT DOCUMENTS

| | | |
|---|---|---|
| KR | 10-2012-0083419 A | 7/2012 |
| KR | 10-1240880 B1 | 3/2013 |
| RU | 2 132 259 C1 | 6/1999 |
| RU | 2 136 453 C1 | 9/1999 |

* cited by examiner

INSERT AND TOOL HOLDER FOR MOUNTING SAME

TECHNICAL FIELD

The present disclosure relates to an insert for use in cutting or grooving, and a tool holder for mounting the same.

BACKGROUND ART

Generally, an insert is coupled to a cutting tool mounted on a machine tool, and used for cutting a workpiece composed of ferrous, nonferrous metal, nonmetal materials, and so on.

Such insert typically includes an upper surface, a lower surface, and a plurality of side surfaces connecting the upper surface with the lower surface. An upper cutting edge is provided between the side surface and the upper surface, and a lower cutting edge is provided between the side surface and the lower surface.

One of conventional examples is disclosed in Korean Pat. No. 10-1240880 and illustrated in FIGS. 7 and 8, which is a double sided insert including an upper side (upper surface) 11, a lower side (upper surface) 12, and cutting edges 13A, 13B, 14A, 14B, 15A, 15B formed therebetween, in which the upper side 11 and the lower side 12 are substantially identical such that a use of dual sides is enabled. Specifically, in order to cut the workpiece with more ease, a main cutting edge (hereinbelow, 'main cutting edge') 16 is provided with an inclination angle, and such main cutting edge 16 is connected to a chip break concave portion 21 (hereinbelow, 'inclined surface') concaved with respect to plane surfaces P1, P2.

However, because the related double sided insert is a dual-surface type insert that uses both the upper surface 11 and the lower surface 12, the insert has a limited thickness and therefore, the main cutting edges on both of the surfaces have limited inclination angle. In order to overcome such limit, the thickness of the insert can be increased, but in that case, it is difficult to fabricate a tool holder, and coupling characteristic also deteriorates. If the main cutting edge is fabricated to be approximately half the size of one side surface, this rather causes deteriorated cutting efficiency because the cutting depth is decreased.

DISCLOSURE OF INVENTION

Technical Problem

An object of the present disclosure is to solve the problems mentioned above, and accordingly, it is an object of the present disclosure to provide an insert in which an edge is formed exclusively between an upper surface and a side surface such that the cutting edge with a limited thickness can have a sufficient inclination angle and also have enhanced coupling characteristic.

Another technical object of the present disclosure is to provide an insert with enhanced coupling characteristic, and a tool holder for mounting the same.

Solution to Problem

In order to achieve the above and other objects, an insert is provided, which may include three or more corners along a perimeter; a main cutting edge formed on an edge between an upper surface and a main side surface, and a sub cutting edge formed on an edge between the upper surface and a sub side surface, in which the main cutting edge and the sub cutting edge are placed in succession between the corners; and a flat lower surface. The main cutting edge forms an inclination angle such that a height decreases gradually in a direction toward the sub cutting edge. The main side surface is formed by a first end main side surface in contact with the main cutting edge, and a second end main side surface in contact with the lower surface, with the first end main side surface and the second end main side surface being formed in succession with different clearance angles from each other. The sub side surface may be formed by a first end sub side surface in contact with the sub cutting edge, and a second end sub side surface in contact with the lower surface, with the first end sub side surface and the second end sub side surface being formed in succession with different clearance angles with each other.

The clearance angles of each of the second end main side surface and the second end sub side surface may form an obtuse angle with respect to the lower surface.

The clearance angle of the second end main side surface with respect to the lower surface may be greater than the clearance angle of the second end sub side surface surface with respect to the lower surface.

The clearance angle of each of the first end main side surface and the first end sub side surface with respect to the lower surface may be less than the clearance angle of the second end sub side surface with respect to the lower surface.

The clearance angle of each of the first end main side surface and the first end sub side surface may form right angle with respect to the lower surface.

An inclined surface may be formed on the upper surface, and inclined downwardly in a direction from the main cutting edge toward a center of the upper surface.

Meanwhile, a tool holder for mounting the insert according to an embodiment may be provided, which may include a lower surface seat having a same shape as the lower surface to be surface-contacted with the lower surface, a main side surface seat having a same shape as the first end main side surface to be surface-contacted with the first end main side surface, and a sub side surface seat having a same shape as the first end sub side surface to be surface-contacted with the first end sub side surface.

Advantageous Effects

According to an embodiment of the present disclosure, an insert and a tool holder for mounting the same can provide the following effects.

According to an embodiment, in combination with a technical configuration of the insert which has the cutting edge processed on only one surface, additional technical configurations are provided, which are: a technical configuration in which the main cutting edge forms an inclination angle such that the height is gradually decreased in a direction toward the sub cutting edge; a technical configuration in which the main side surface is formed by the first end main side surface in contact with the main cutting edge and the second end main side surface in contact with the lower surface, which are formed in succession with different clearance angles from each other; and a technical configuration in which the sub side surface is formed by the first end sub side surface in contact with the sub cutting edge and the second end sub side surface in contact with the lower surface, which are formed in succession with different clearance angles from each other. Accordingly, compared to a double sided insert which has cutting edges processed on both of the surfaces, it is possible to give sufficient inclination angle to the main cutting edge to thus provide enhanced machinability such as increased cutting depth, and so on, without requiring the thickness (i.e., height between the upper surface and the lower surface) to be increased, and without requiring the length of the main cutting edge to be reduced. Further, by including the first and second end main side surfaces with different clearance angles from each other, and the first and second end sub side surfaces with different clearance angles from each other, it is possible to enhance coupling with the tool holder by using the first end main side surface and the first end sub side surface, and also minimize interference between the tool holder and the workpiece by using the second end main side surface and the second end sub side surface.

Further, according to an embodiment of the present disclosure which provides a technical configuration in which the clearance angle of the second end main side surface with respect to the lower surface is greater than the clearance angle of the second end sub side surface, interference of the tool holder can be minimized, with respect to the side surface of the workpiece that is subject to a relatively strong contact resistance by the contact with the main cutting edge.

MODE FOR THE INVENTION

Certain exemplary embodiments of the present inventive concept will be described in greater detail with reference to the accompanying drawings to enable those skilled in the art to work the present disclosure. However, it is not intended to limit the technology described herein to any specific embodiments, as it should be construed as encompassing various modifications, equivalents and/or alternatives of the embodiments.

Figure 1:
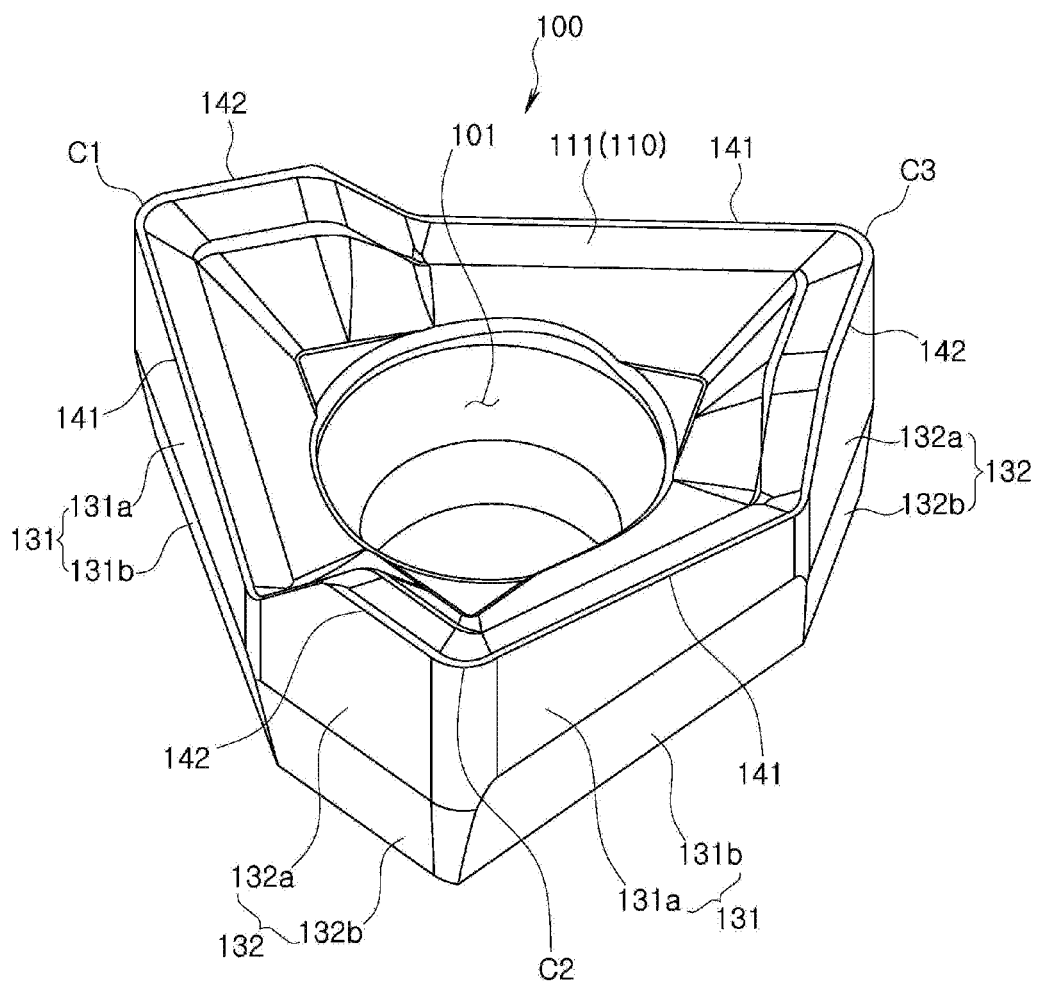
FIG. 1 is a perspective view illustrating an insert according to an embodiment of the present disclosure.
Figure 2:
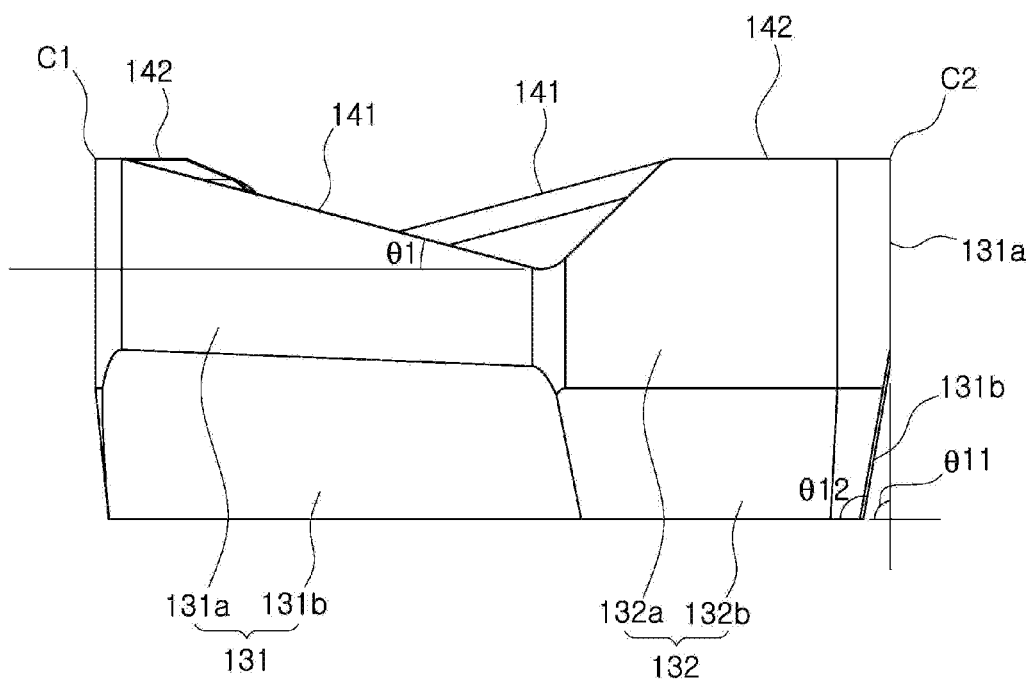
FIG. 2 is a side view illustrating a main side surface and a sub side surface in parallel with each other, of the insert of FIG. 1.
Figure 3:
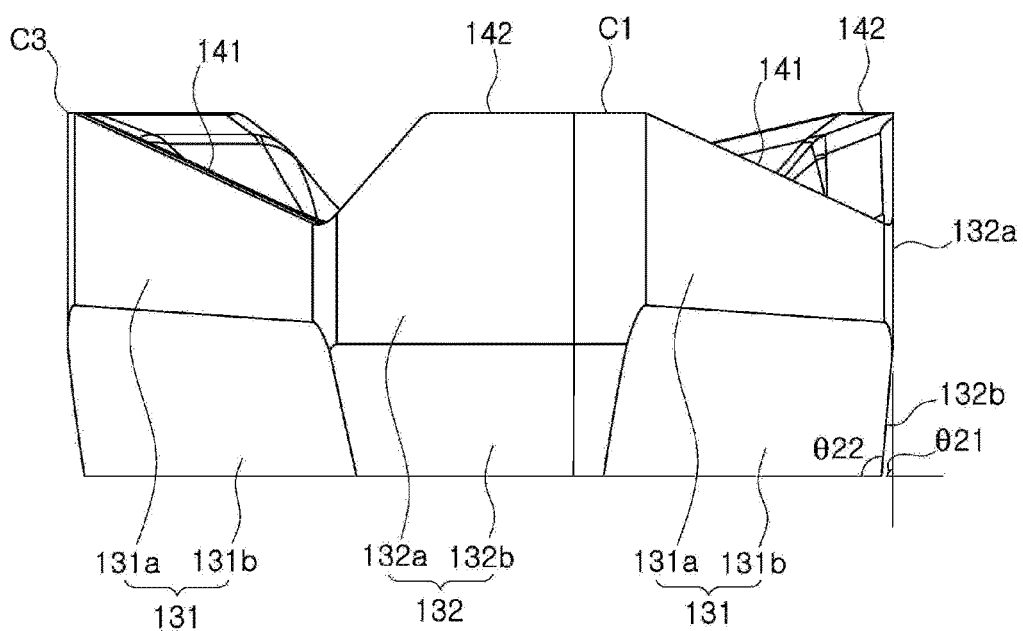
FIG. 3 is a side view seen from a corner side, to show the first end main side surface and the sub side surface, and the second end main side surface altogether, of the insert of FIG. 1.

FIG. 1 is a perspective view illustrating an insert according to an embodiment of the present disclosure, FIG. 2 is a side view illustrating a main side surface and a sub side surface in parallel with each other, of the insert of FIG. 1, and FIG. 3 is a side view seen from a corner side, to show the first end main side surface and the sub side surface, and the second end main side surface altogether, of the insert of FIG. 1.

Figure 4:
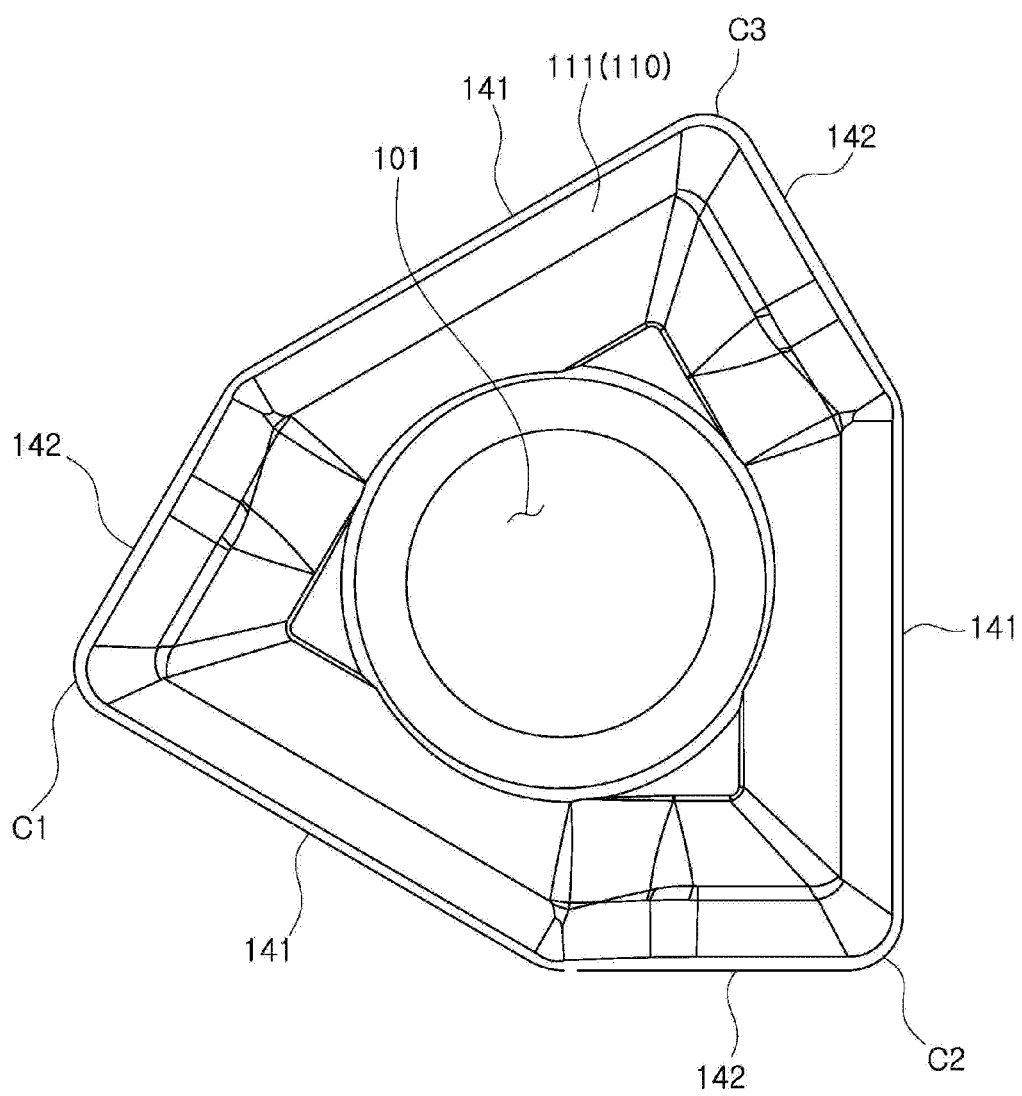
FIG. 4 is a plan view illustrating an upper surface of the insert of FIG. 1.
Figure 5:
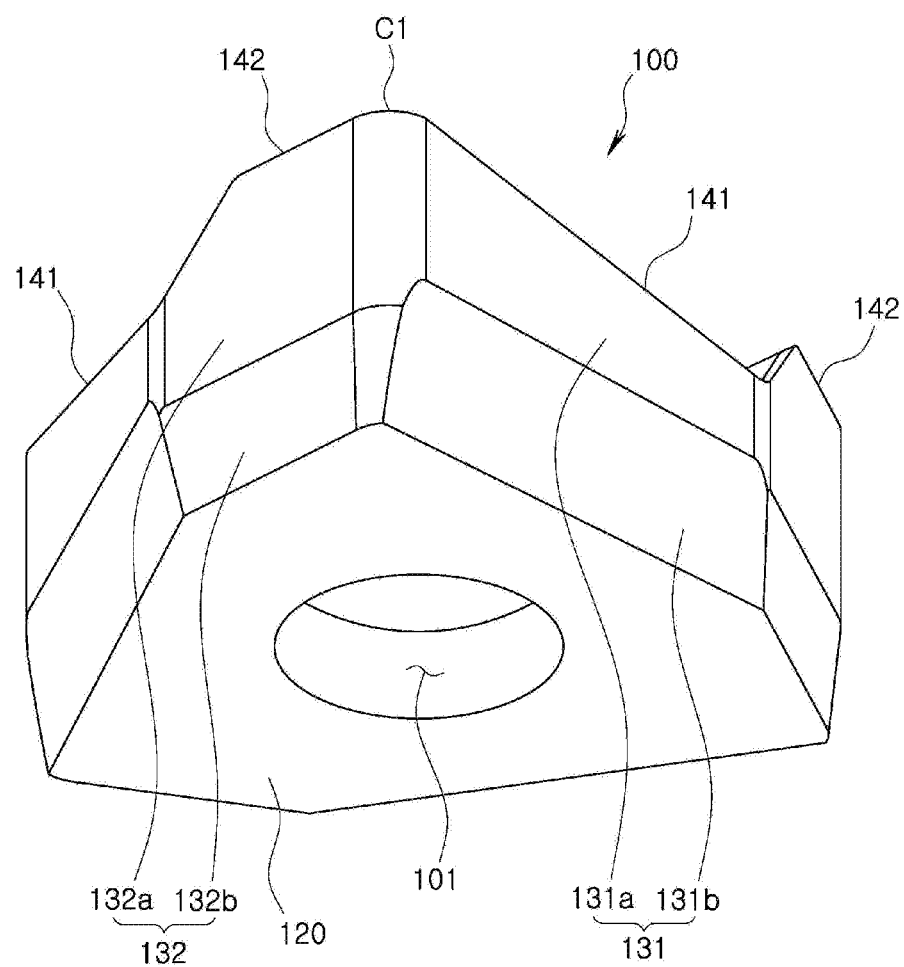
FIG. 5 is a bottom perspective view illustrating the upper surface of the insert of FIG. 1.

FIG. 4 is a plan view illustrating an upper surface of the insert of FIG. 1, and FIG. 5 is a bottom perspective view illustrating the upper surface of the insert of FIG. 1.

As illustrated in FIGS. 1 to 5, the insert 100 according to an embodiment of the present disclosure has three or more corners C1, C2, C3 along a perimeter; a main cutting edge 142 formed on an edge between the upper surface 110 and the main side surface 131, and a sub cutting edge 142 formed on an edge between the upper surface 110 and the sub side surface 132, in which the main cutting edge 142 and the sub cutting edge 142 are placed in succession between the corners (i.e., between C1 and C2, between C2 and C3, between C3 and C1); and a flat lower surface 120. For example, the corners C1, C2, C3 may have approximately right-angled shape, and there may be three corners provided. In particular, as illustrated in FIGS. 2 and 3, the main cutting edge 141 may form such an inclination angle ($\theta 1$ of FIG. 2) that the height is gradually decreased as closer toward the direction of the sub cutting edge 142.

Accordingly, in combination with the insert 100 in which the main cutting edge 141 and the sub cutting edge 142 are processed on only one surface, a technical configuration is incorporated, in which an inclination angle ($\theta 1$ of FIG. 2) is formed such that the height is gradually decreased as the main cutting edge 141 becomes closer toward the direction of the sub cutting edge 142. Accordingly, unlike the related double sided insert that is processed with the cutting edges on both of the surfaces, sufficient inclination angle ($\theta 1$ of FIG. 2) can be provided to the main cutting edge 141, without requiring the thickness (i.e., height between the upper surface 110 and the lower surface 120) to be increased, and without requiring the length of the main cutting edge 141 to be reduced. As a result, enhanced machinability, such as increased cutting depth, and so on, can be provided.

In addition, as illustrated in FIGS. 1 to 3, and 5, the main side surface 131 described above is formed by the first end main side surface 131$a$ in contact with the main cutting edge 141 and the second end main side surface 131$b$ in contact with the lower surface 120, in which the first end main side surface 131$a$ and the second end main side surface 131$b$ are formed in succession with different clearance angles ($\theta 11$, $\theta 12$ in FIG. 2) from one another, and the sub side surface 132 is formed by the first end sub side surface 132$a$ in contact with the sub cutting edge 142, and the second end sub side surface 132$b$ in contact with the lower surface 120, in which the first end sub side surface 132$a$ and the second end sub side surface 132$b$ are formed in succession with different clearance angles ($\theta 21$, $\theta 22$ in FIG. 3) from one another.

Accordingly, by incorporating a technical configuration in which the main side surface 131 has the first and second end main side surfaces 131$a$, 131$b$ with different clearance angles ($\theta 11$, $\theta 12$ in FIG. 2) from one another, and also by incorporating a technical configuration in which the sub side surface 132 has the first and second end sub side surfaces 132$a$, 132$b$ with different clearance angles ($\theta 21$, $\theta 22$ in FIG. 3) from one another, coupling with the tool holder 200 (FIG. 6) can be enhanced using the first end main side surface 131$a$ and the first end sub side surface 132$a$, and interference between the tool holder 200 and the workpiece (not illustrated) can be reduced using the second end main side surface 131$b$ and the second end sub side surface 132$b$.

Moreover, the clearance angle ($\theta 12$) of the second end main side surface 131$b$ and the clearance angle ($\theta 22$) of the second end sub side surface 132$b$ may each form an obtuse angle with respect to the lower surface 120.

Accordingly, the clearance angles ($\theta 12$, $\theta 22$) of the second end may maintain the second end main side surface 131b and the second end sub side surface 132b of the insert 100, and the tool holder 200 on which the lower surface 120 of the insert 100 is seated, at a distance apart from the bottom surface and the side surface of the workpiece (not illustrated). As a result, interference with the workpiece can be minimized.

Further, the clearance angle ($\theta 12$) of the second end main side surface 131b with respect to the lower surface 120 may be greater than the clearance angle ($\theta 22$) of the second end sub side surface 132b with respect to the lower surface 120. Accordingly, interference of the tool holder 200 with the side surface of the workpiece (not illustrated), which is subject to relatively strong contact resistance by the contact with the main cutting edge 141, can be minimized.

Further, the clearance angle ($\theta 11$) of the first end main side surface 131a with respect to the lower surface 120, and the clearance angle ($\theta 21$) of the first end sub side surface 132a with respect to the lower surface 120 may each be less than the clearance angle ($\theta 22$) of the second end sub side surface 132b with respect to the lower surface 120. In a preferred embodiment, the clearance angle ($\theta 11$) of the first end main side surface 131a and the clearance angle ($\theta 21$) of the first end sub side surface 132a may each form right angle with respect to the lower surface 120. Such difference in the clearance angles can enhance coupling with the tool holder 200 through the first, and also reduce interference between the tool holder 200 and the workpiece through the second end.

Further, an inclined surface 111 may be formed on the upper surface 110, which is downwardly inclined in a direction from the main cutting edge 141 to the center of the upper surface 110. Accordingly, instead of being tangled with each other, the chips (not illustrated) peeled off from the workpiece (not illustrated) can be easily conveyed along the inclined surface 111 to be discharged out.

Hereinbelow, the tool holder 200 according to an embodiment of the present disclosure will be described.

Figure 6:
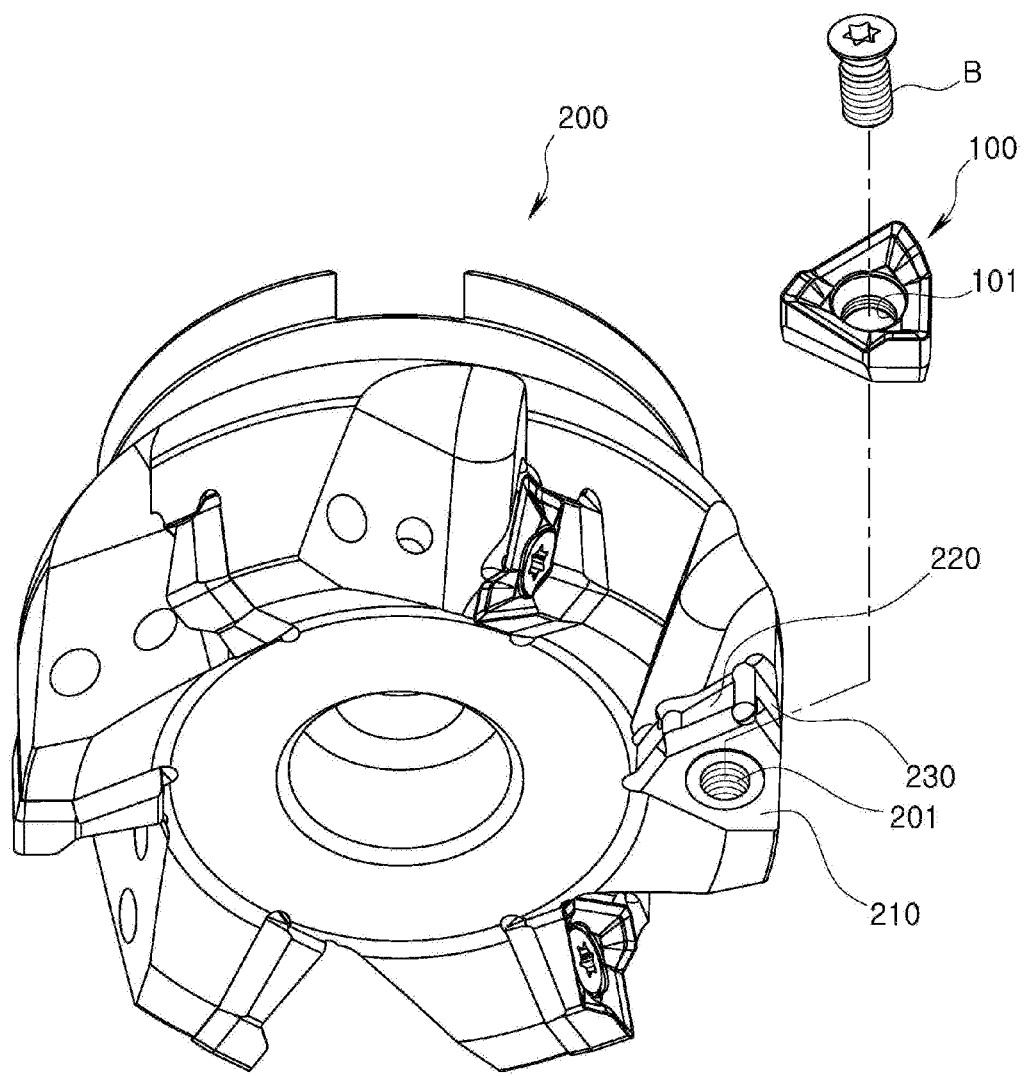
FIG. 6 is a perspective view illustrating an assembly of an insert and a tool holder according to an embodiment of the present disclosure.
Figure 7:
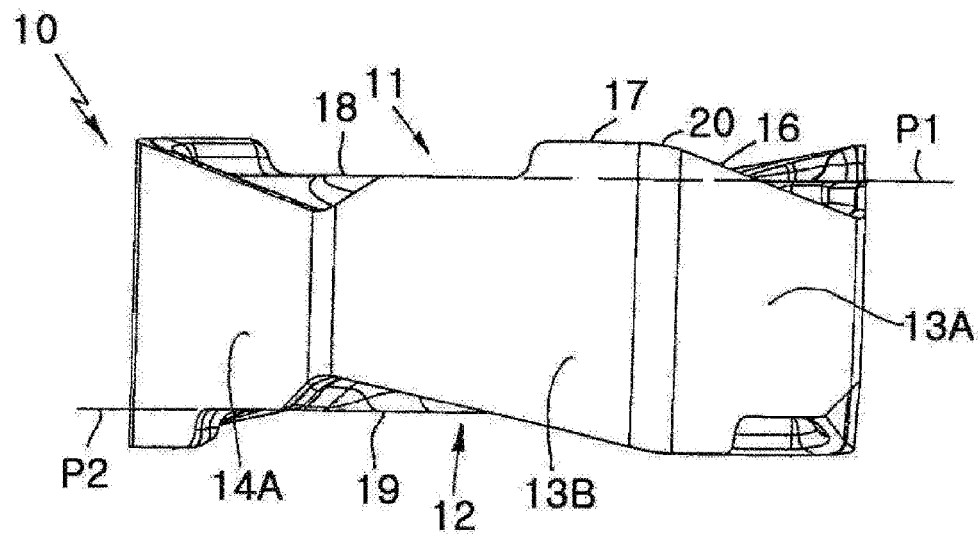
FIG. 7 is a side view seen from a corner side, to show the first end main side surface and the sub side surface, and the second end main side surface altogether, of a related double sided insert.
Figure 8:
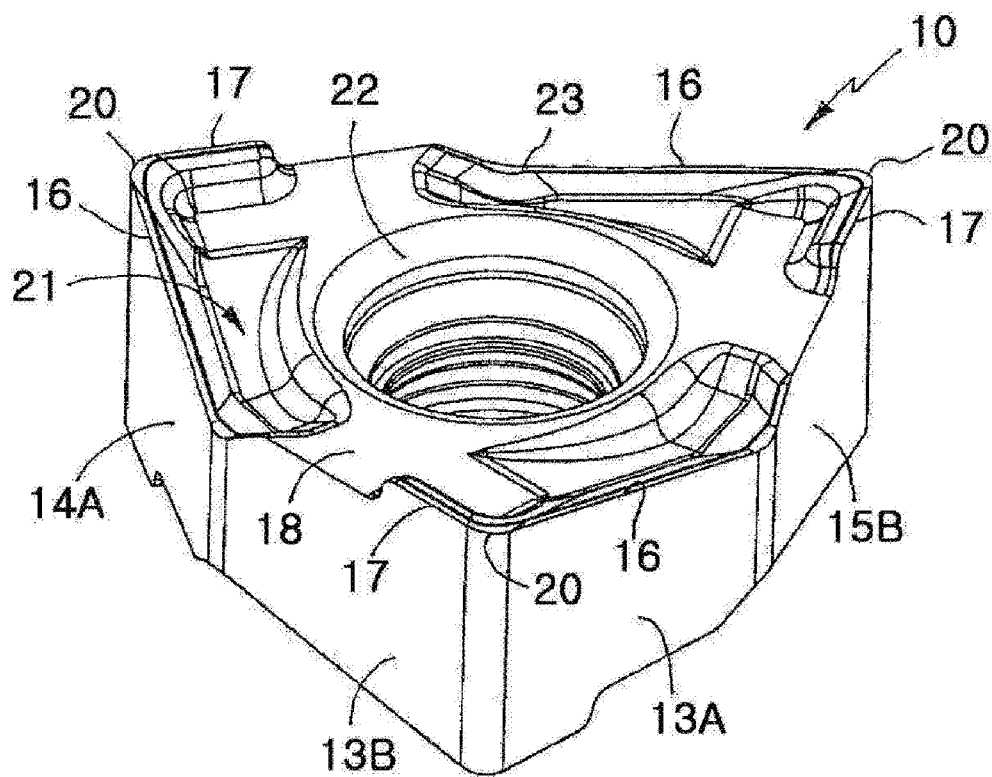
FIG. 8 is a perspective view illustrating the double sided insert of FIG. 7.

FIG. 6 is a perspective view illustrating an assembly of an insert and a tool holder according to an embodiment of the present disclosure.

As illustrated in FIG. 6, the tool holder 200 according to an embodiment of the present disclosure includes a lower surface seat 210, a main side surface seat 220, and a sub side surface seat 230.

The lower surface seat 210 receives the lower surface 120 of the insert 100 seated thereon, and has a flat shape like the lower surface 120 to enable surface-contact with the lower surface 120 of the insert 100. Further, a screw hole 201 is formed in the lower surface seat 210 at a location corresponding to a through hole 101 of the insert 100. For reference, a bolt B passed through the through hole 101 may be engaged with the screw hole 201.

The main side surface seat 220 receives the first end main side surface 131a of the insert 100 seated thereon, and has a shape corresponding to the first end main side surface 131a to allow surface contact.

The sub side surface seat 230 receives the first end sub side surface 132a of the insert 100 seated thereon, and has a shape corresponding to the first end sub side surface 132a to allow surface contact.

Accordingly, coupling between the tool holder 200 and the insert 100 can be enhanced, since the lower surface 120, the first end main side surface 131a, and the first end sub side surface 132a of the insert 100 are brought into a tight surface-contact with the lower surface seat 210, the main side surface seat 220 and the sub side surface seat 230 of the tool holder 200, and then coupled by the bolt B.

As described above, the insert 100 and the tool holder 200 for mounting the same according to embodiments of the present disclosure can provide the following effects.

According to an embodiment of the present disclosure, in combination with a technical configuration of the insert 100 which has the main cutting edge 141 and the sub cutting edge 142 processed on only one surface, technical configurations are provided, which are: a technical configuration in which the main cutting edge 141 forms an inclination angle ($\theta 1$ of FIG. 2) such that the height is gradually decreased in a direction toward the sub cutting edge 142; a technical configuration in which the main side surface 131 is formed by the first end main side surface 131a in contact with the main cutting edge and the second end main side surface 131b in contact with the lower surface 120, in which the first end main side surface 131a and the second end main side surface 131b are formed in succession with different clearance angles ($\theta 11$, $\theta 12$ of FIG. 2) from each other; and a technical configuration in which the sub side surface 132 is formed by the first end sub side surface 132a in contact with the sub cutting edge 142 and the second end sub side surface 132b in contact with the lower surface 120, in which the first end sub side surface 132a and the second end sub side surface 132b are formed in succession with different clearance angles ($\theta 21$, $\theta 22$ of FIG. 3) from each other. Accordingly, compared to a double sided insert which has cutting edges processed on both of the surfaces, it is possible to give sufficient inclination angle ($\theta 1$ of FIG. 2) to the main cutting edge 141 to thus provide enhanced machinability such as increased cutting depth, and so on, without requiring the thickness (i.e., height between the upper surface 110 and the lower surface 120) to be increased, and without requiring the length of the main cutting edge 141 to be reduced. Further, by including the first and second end main side surfaces 131a, 131b with different clearance angles ($\theta 11$, $\theta 12$ of FIG. 2) from each other, and the first and second end sub side surfaces 132a, 132b with different clearance angles ($\theta 21$, $\theta 22$) from each other, it is possible to enhance coupling with the tool holder 200 (FIG. 6) by using the first end main side surface 131a and the first end sub side surface 132a, and also minimize interference between the tool holder 200 and the workpiece (not illustrated) by using the second end main side surface 131b and the second end sub side surface 132b.

Further, according to an embodiment of the present disclosure which provides a technical configuration in which the clearance angle ($\theta 12$ of FIG. 2) of the second end main side surface 131b with respect to the lower surface 120 is greater than the clearance angle ($\theta 22$ of FIG. 3) of the second end sub side surface 132b, interference of the tool holder 200 can be minimized, with respect to the side surface of the workpiece (not illustrated) that is subject to a relatively strong contact resistance by the contact with the main cutting edge 141.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present disclosure relates to an insert and a tool holder for mounting the same, and has industrial applicability, since it is applicable to cutting of a workpiece.

What is claimed is:

1. An insert for use in and being mounted on a tool holder, the insert comprising:
   three substantially right-angled corners along a perimeter;
   a main cutting edge formed on an edge between an upper surface and a main side surface, and a sub cutting edge formed on an edge between the upper surface and a sub side surface, wherein the main cutting edge and the sub cutting edge are placed in succession between the corners; and
   a flat lower surface,
   wherein:
   the main cutting edge forms an inclination angle such that a height decreases gradually in a direction toward the sub cutting edge,
   the main side surface is formed by a first end main side surface in contact with the main cutting edge, and a second end main side surface in contact with the lower surface, wherein the first end main side surface and the second end main side surface are formed in succession with different clearance angles from each other,
   the sub side surface is formed by a first end sub side surface in contact with the sub cutting edge, and a second end sub side surface in contact with the lower surface, wherein the first end sub side surface and the second end sub side surface are formed in succession with different clearance angles with each other,
   a clearance angle of the second end main side surface forms an obtuse angle with respect to the lower surface, and a clearance angle of the second end sub side surface forms an obtuse angle with respect to the lower surface,
   the clearance angle of the second end main side surface with respect to the lower surface is greater than the clearance angle of the second end sub side surface with respect to the lower surface,
   a clearance angle of the first end main side surface forms a right angle with respect to the lower surface, and a clearance angle of the first end sub side surface forms a right angle with respect to the lower surface, and
   both of the first end main side surface and the first end sub side surface, when the insert is mounted on the tool holder, are surface-contacted with the tool holder.

2. The insert of claim 1, wherein an inclined surface is formed on the upper surface, and inclined downwardly in a direction from the main cutting edge toward a center of the upper surface.

3. A tool holder for mounting the insert of claim 2, comprising:
   a lower surface seat having a same shape as the lower surface to be surface-contacted with the lower surface;
   a main side surface seat having a same shape as the first end main side surface to be surface-contacted with the first end main side surface; and
   a sub side surface seat having a same shape as the first end sub side surface to be surface-contacted with the first end sub side surface.

4. A tool holder for mounting the insert of claim 1, comprising:
   a lower surface seat having a same shape as the lower surface to be surface-contacted with the lower surface;
   a main side surface seat having a same shape as the first end main side surface to be surface-contacted with the first end main side surface; and
   a sub side surface seat having a same shape as the first end sub side surface to be surface-contacted with the first end sub side surface.

* * * * *